Figure 1:
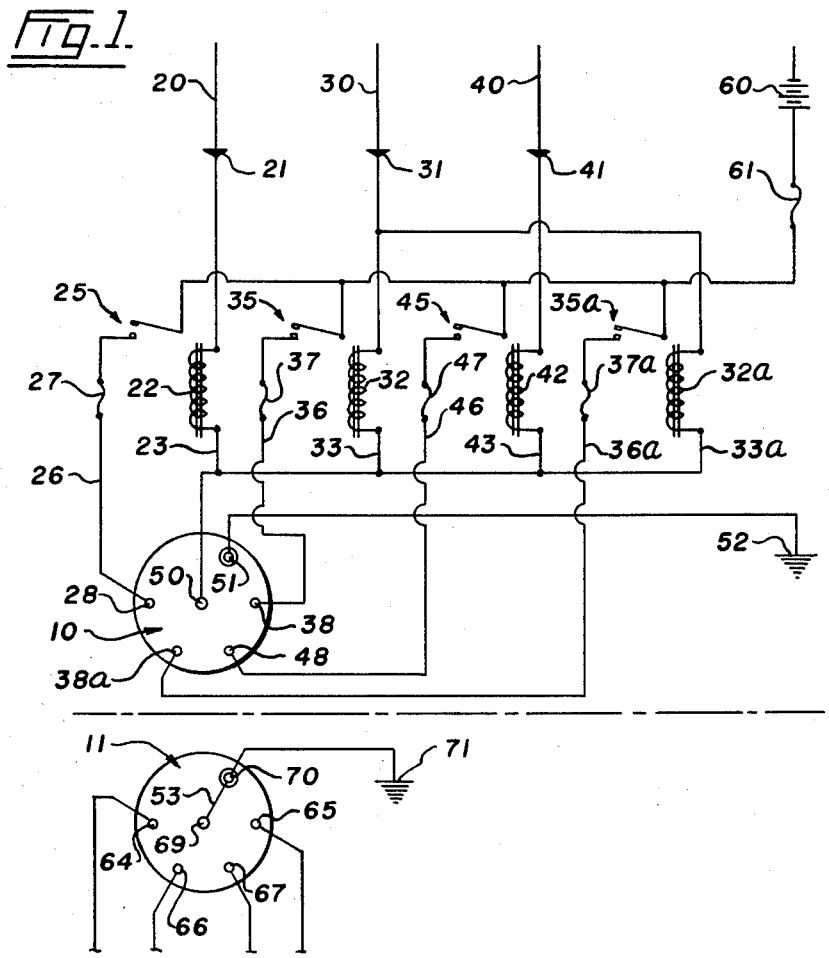

United States Patent
Klein

[15] 3,671,757
[45] June 20, 1972

[54] TRACTOR TRAILER LIGHTING SYSTEMS

[72] Inventor: John Ray Klein, Burnaby, British Columbia, Canada

[73] Assignee: Klein & Anderson Ltd., Vancouver, British Columbia, Canada

[22] Filed: June 1, 1970

[21] Appl. No.: 42,000

[52] U.S. Cl............................307/10 LS, 315/82, 280/422, 280/204
[51] Int. Cl. .........................................................H02g 3/00
[58] Field of Search.................315/82; 280/422, 204; 307/9, 307/10

[56] References Cited

UNITED STATES PATENTS 3,467,830  9/1969  Dobrikin..................................307/10

Primary Examiner—Herman J. Hohauser
Attorney—Fetherstonhaugh & Co.

[57] ABSTRACT

To protect the tractor lighting system from the effects of short circuits in the trailer lighting system the tractor and trailer lighting systems are separated. The tractor system includes a control element such as the coil of a relay and the trailer system a switching element operable by the control element.

11 Claims, 2 Drawing Figures

PATENTED JUN 20 1972 3,671,757

INVENTOR
JOHN R. KLEIN
BY
Fetherstonhaugh & Co.
ATTORNEYS

TRACTOR TRAILER LIGHTING SYSTEMS

This invention is concerned with lighting systems for vehicles and for units towed or carried by the vehicles. It is particularly concerned with tractor trailer lighting systems and with lighting systems for truck campers i.e. pickup trucks upon which a camper body is removably mounted.

For the sake of brevity, throughout this specification, the expressions "tractor" and "trailer" are used to include commercial tractor trailer rigs, passenger cars and boat or camping trailers and truck-campers and the like.

Existing trailer lighting systems are notoriously susceptible to short circuits because of the releasable connections between them and the tractor, their infrequent use and the vibration to which they are subject.

Presently trailer lighting systems are directly connected to the tractor lighting systems so that when a short circuit occurs in the trailer system the tractor system is exposed to that short circuit. This invention seeks to provide means for protecting the tractor lighting system from the effect or short circuits in the lighting systems of a coupled trailer. According to this invention the tractor lighting system is not connected to the trailer lighting system but only is arranged to operate a control which actuates associated switching means in a separate circuit for the trailer.

The control means can for example be the coil of a relay of which the contacts are located in the trailer lighting systems, the arrangement being such that as the solenoid is energized the contacts are closed and so the trailer lighting system is operated. It will be appreciated that where the arrangement is used in the turn signal lighting systems, the solenoid will serve as the flasher for the trailer lighting system and thus relieve the load on the flasher unit of the tractor. It will be appreciated that with this arrangement the flasher unit of the tractor will operate at substantially normal speeds rather than as is usual when a tractor is coupled to a trailer, operating at a much increased speed. As the driver is derived of this indication of the fact that the trailer lighting system is operative it is highly desirable to provide in the system according to this invention, pilot lights arranged in the trailer lighting system to indicate to the driver that that system is operative.

In tractor trailer systems there are many intermittent short circuits in the trailer resulting from vibration and with existing tractor trailer lighting systems these short circuits can easily burn out the tractor fuse thus leaving the vehicle without rear lighting. It is common practice in North American cars to have the park lights, tail lights, stop lights and turn signal lights and dash lights protected by a common fuse and therefore if such a short circuit occurs the driver is left with only head lights.

To overcome this difficulty it is proposed according to this invention to provide in the trailer lighting system a fuse. In this way in the event of the fuse burning out only the light associated with that fuse on the trailer will be lost. Most desirably the fuse is of the resettable circuit breaker type and even more desirably is of the self-resetting type so that in the event of a momentary short circuit in the trailer system the circuit is broken thus protecting the system and after a brief pause is remade.

It is of course to be appreciated that the relay could be replaced by a solid state device in which the current is carried to the trailer lighting system through the emitter-collector circuit and the tractor lighting system is connected to the base to make the semi-conductor device conductive and non-conductive according to whether the lighting system of the tractor is energized.

Figure 2:
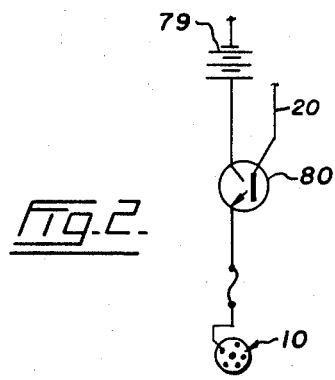

An embodiment of this invention is illustrated schematically in the accompanying drawings in which:

FIG. 1 is a circuit diagram of apparatus, and
FIG. 2 schematically illustrates the use of a transistor in place of a solenoid in this apparatus.

The apparatus in the drawing comprises a tractor plug 10 adapted to be coupled to a trailer socket 11. Clearly the plug could be on the trailer and socket on the tractor if desired.

In the drawings the lead 20 is connectable to the left turn signal switch of the tractor, lead 30 to the park light switch and lead 40 to the right turn signal switch. The leads 20, 30 and 40 each have diodes 21, 31 and 41 respectively and the turn signal leads are connected to associated solenoids 22 and 42 respectively while the lead 30 is connected to two solenoids 32 and 32a, each one of which, as will be described hereinafter, is associated with one of the parking lights of the trailer.

The solenoids are then connected through leads 23, 33, 33a and 43 to a common center pin 50 of the plug 10. A pin 51 of the plug 10 is connected to ground as indicated at 52, and the center pin 50 and pins 51 are interconnected when the plug and socket elements 10 and 11 are united by a bridge 53 within the trailer socket so that the solenoids can be energized only when the union of the plug and socket is made.

The battery 60 of the tractor is connected through a conventional fuse 61 to one side of the switching elements 25, 35, 35a and 45 associated with respective ones of the solenoids 22, 32, 32a and 42.

The other sides of the switching elements are connected by leads 26, 36, 36a and 46 through resettable circuit breakers 27, 37, 37a and 47 respectively to associated pins 28, 38, 38a, and 48 of the plug 10. Each of these circuit breakers is preferably the type which comprises a bi-metal element adapted to break the circuit upon existance of a high temperature and to re-establish the circuit as the temperature falls.

On the socket 11 there are holes for engagement by the plugs pins 28, 38, 38a and 48 numbered respectively 64, 65, 66 and 67 and, as has been described hereinbefore there is a bridge 53 connecting the center hole 69 with hole 70 for engagement by the pin 51 to complete the circuits from the solenoids 22, 32, 42 and 32a to the ground 52. Also associated with the hole 70 is the trailer ground 71.

It will be appreciated that with the arrangement described herein the lighting system of the tractor is completely electrically isolated from the trailer system. The tractor lighting system merely includes the solenoids and the solenoids circuits are only completed when the plug and socket connection between the tractor and trailer is made so that the solenoids and their associated contacts are not operated more frequently than is necessary.

It will be appreciated that the solenoids 22 and 42 will be operated intermittently by the turn signal flasher unit to cause the switching contacts 25 and 45 to be opened and closed to produce the flashing indication at the trailer lighting system. Clearly there may be separate connections for the brake light circuits or the turn signal lamps could be used as the brake lights.

It is to be appreciated that the solenoids could simply be replaced by a transistor to which the supply to the trailer system would be through the emitter-collector circuit and the base of the transistor would be connected to the tractor lighting system. Such an arrangement is illustrated schematically in FIG. 2 for one light circuit, for example circuit 20. The power supply 79 is connected to the appropriate trailer light through the emitter-collector circuit of transistor 80 and the transistor is rendered conductive and non-conductive according to the application of current to the base through lead 20 of the tractor lighting system.

I claim:

1. Circuit protector apparatus for a tractor unit having a plurality of light circuits and trailer unit having a corresponding plurality of light circuits, said apparatus comprising a battery on the tractor unit, a normally off switching device, a circuit breaker, first circuit means for connecting said battery, said switching device and said circuit breaker in a series circuit, separable plug and socket means for connecting said series circuit to one of said trailer unit light circuits, and further circuit means connected to the tractor light circuit corresponding to said one of said trailer light circuits and including control means for controlling switching of said switching device of said first circuit means.

2. Apparatus as claimed in claim 1 in which the circuit breaker is resettable.

3. Apparatus as claimed in claim 2 in which the circuit breaker is automatically resettable.

4. Apparatus as claimed in claim 1 in which the circuit breaker comprises a bi-metal element adapted to break the circuit upon the existance of a high temperature and to re-establish the circuit as the temperature falls.

5. Apparatus as claimed in claim 1 in which said switching element is a transistor having an emitter collector circuit, and a base that constitutes the control element.

6. Apparatus as claimed in claim 3 in which said switching element is a transistor having an emitter collector circuit, and a base that constitutes the control element.

7. Apparatus as claimed in claim 1 in which the control element comprises a solenoid and the switching element comprises contacts operable by the solenoid.

8. Apparatus as claimed in claim 3 in which the control element comprises a solenoid and the switching element comprises contacts operable by the solenoid.

9. Apparatus as claimed in claim 7 in which the solenoid is grounded to complete the circuit including the second conductor only when the plug and socket are coupled.

10. Circuit protector apparatus for a tractor unit having a plurality of light circuits and trailer unit having a corresponding plurality of light circuits, said apparatus comprising a battery on the tractor unit, a normally off switching device, a circuit breaker, first circuit means for connecting said battery, said switching device and said circuit breaker in a series circuit, separable plug and socket means for connecting said series circuit to one of said trailer unit light circuits, and further circuit means connected to the tractor light circuit corresponding to said one of said trailer light circuits and including a solenoid for controlling switching of said switching device of said first circuit means, said apparatus further comprising a conductor for connecting said solenoid to ground through said plug and socket means.

11. Apparatus as claimed in claim 10 in which said circuit breaker is automatically resettable.

* * * * *